United States Patent Office 3,288,688
Patented Nov. 29, 1966

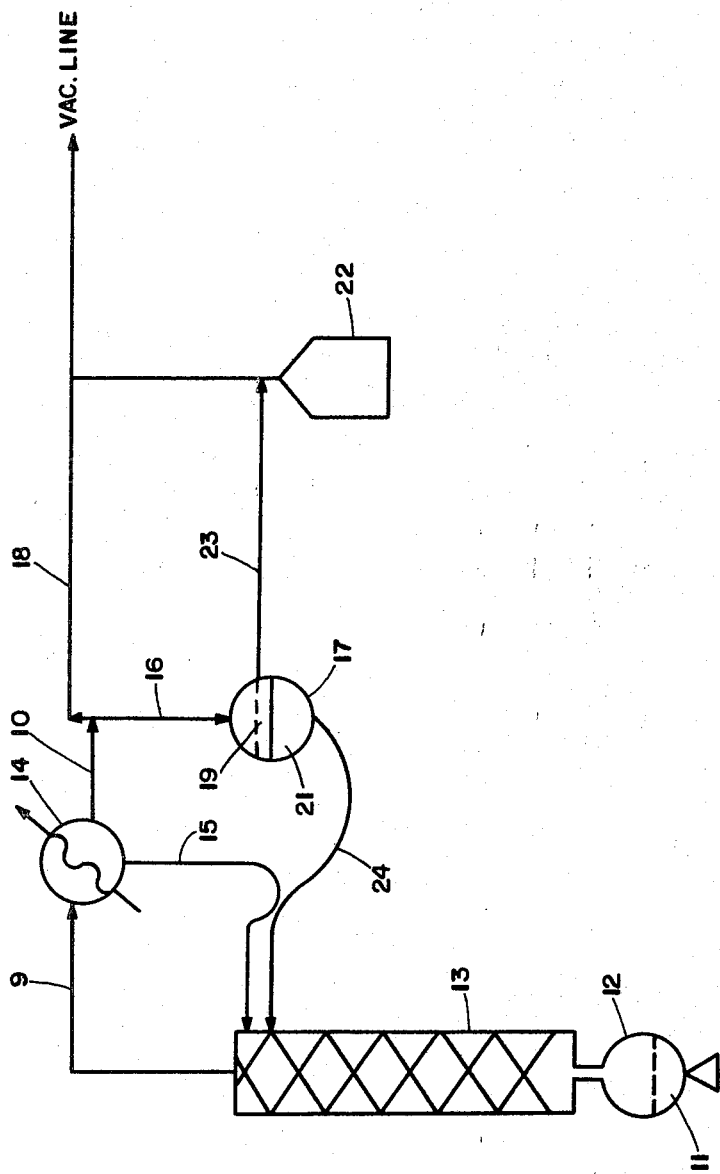

3,288,688
p-CYMENE PURIFICATION PROCESS
Bernard J. Kane, Atlantic Beach, Fla., assignor to The Glidden Company, Cleveland, Ohio, a corporation of Ohio
Filed Jan. 24, 1966, Ser. No. 522,428
9 Claims. (Cl. 203—58)

This invention relates to a process for separating p-cymene from its mixtures with menthenes and menthanes by fractionally distilling furfural admixtures of same.

In the conversion of menthadienes, as for example, limonene, to p-cymene using a catalyst such as nickel formate or a supported noble metal, e.g., palladium on alumina, carbon, or acid clays, the product formed is a mixture consisting essentially of p-cymene, menthenes, and menthanes. The p-cymene is often only about 50 weight percent of the reaction product. It has, however, been generally impractical to obtain concentrated p-cymene by fractionally distilling such a reaction product; at 100 mm. Hg pressure menthene-1 and p-cymene both boil very close to 109° C.

I have now found that introduction of furfural into the distillation makes it practical to separate menthene-1 from p-cymene, and, additionally, can provide for the efficient concentrating of menthene-1 and the hydrocarbon components of a menthene-3 fraction in separate cuts to an extent not obtainable in conventional fractional distillation.

Broadly, my method for separating p-cymene from a mixture thereof with a compound selected from the group consisting of menthenes and menthanes comprises forming a distilland of the mixture with furfural, and fractionally distilling from the distilland a composition containing furfural and said compound in a fractional distillation zone.

One specific aspect of my invention relates to the above described separation of a mixture comprising p-cymene and menthene-1; further, my invention relates to separating a mixture comprising p-cymene, menthene-1 and menthene-3.

Another specific aspect of my invention includes settling the resulting distillate from the fractional distillation zone into a hydrocarbon-rich fraction and a furfural-rich fraction, and returning the furfural-rich fraction to the distillation zone; a further aspect includes thereafter fractionally distilling said hydrocarbon-rich fraction to yield a bottoms product enriched in hydrocarbon and an overhead distillate enriched in furfural.

From the below-tabulated approximate boiling ranges of these hydrocarbons at 100 mm. Hg absolute pressure and that of their azeotropes with furfural the advantages of my discovery for various fractional distillation separations will be evident.

| Constituent: | ° C. |
|---|---|
| p-Cymene | 109–110 |
| Menthene-1 | 109 |
| Cis-p-menthane | 106 |
| Trans-p-menthane | 102 |
| Menthene-3, cis-menthene-2, and trans-menthene-2 | 101 |
| Azeotrope with furfural: | |
| p-Cymene | 96–97 |
| Menthene-1 | 93 |
| Menthene-3, menthanes, cis- and trans-menthene-2 | 87–89 |

The drawing shows a flow diagram for batch fractional distillation at reduced pressure which I can employ in the practice of my invention. Valves, reflux meters, thermometers, etc. are not shown, but can be used as necessary or desired. This drawing will be described in detail hereinafter in connection wtih the example.

The term "menthanes" as used herein refers to cis-p-menthane and trans-p-menthane. The term "menthenes" as used herein refers to the compounds menthene-1, cis-menthene-2, trans-menthene-2, and menthene-3, which compounds, respectively, can be otherwise referred to as $\Delta^1$-p-menthene, cis-$\Delta^2$-p-menthene, trans $\Delta^2$-p-menthene and $\Delta^3$-p-menthene. Since all of these menthenes and menthanes have the same hydrocarbon substituents all in the para relationship on the six carbon atom ring, for convenience the para qualification is to be understood when referring to these compounds.

In a typical catalytic conversion of menthadienes about 49 weight percent of the resulting product, also referred to herein for convenience as the "reaction product," is p-cymene. Additionally, this reaction product contains typically about 27 weight percent menthene-3 containing about 20–30 percent, basis weight of menthene-3, of cis-menthene-2 or trans-menthene-2 or their mixtures, and typically the reaction product further contains about 17 weight percent menthene-1, and about 5–25 weight percent of cis-p-menthane or trans-p-menthane or their mixtures. Also because the menthadienes preferably are obtained as a by-product in the hydration of pinene to α-terpineol as their economical source, the useful reaction product for my purposes can contain up to about 10 weight percent of components such as camphene, tricyclene, α-terpinene, and high boiling alcohols, e.g., α-fenchol, borneol and isoborneol.

The fractional distilling apparatus comprising my fractional distillation zone is conventional, e.g., a plate-type, sieve-type, or packed column with reflux and heat input appurtenances. It can be a continuous or batch apparatus, preferably batch apparatus for economy. Distillation is done at subatmospheric pressure to reduce the boiling point of the hydrocarbon substances handled, preferably at about 500 mm. Hg absolute pressure for efficiency and economy, although distillation can be done at lower pressure or at higher pressure, e.g., at atmospheric pressure or above if desired.

Initially the typical reaction product from menthadiene conversion can be topped without furfural to yield a distillate fraction enriched in menthene-3, cis- and trans-menthene-2 and trans-p-menthane (known as a "menthene-3 fraction"), and a subsequent cut enriched in cis-p-menthene can be taken, if desired. The resulting bottoms, enriched in p-cymene and menthene-1, then can be subjected to my fractional distillation with furfural. Alternatively the furfural can be introduced at the start of fractional distillation in accordance with the precepts of my invention to yield a furfural-menthene-3 fraction, also rich in cis-p-menthane, a furfural-menthene-1-rich fraction, and a bottoms product enriched in p-cymene.

The furfural-hydrocarbon distillates boiling at a temperature lower than a furfuryl-p-cymene distillate separate by gravity upon condensation and settling into an upper hydrocarbon-rich liquid phase and a lower furfural-rich liquid phase at about room temperature. The furfural-rich liquid phase can be returned to the distillation zone to supply furfural thereto, the quantity of furfural introduced initially and by recycle to the distillation preferably being restricted to that amount which leaves very little furfural in the p-cymene-rich bottoms product, most or all of the furfural having been distilled with the previous hydrocarbon fractions.

Cleanup of one or more of the settled and separated hydrocarbon-rich liquid phases collected by distillation to remove soluble furfural can be done by subsequent fractional distillation to top off a furfural-hydrocarbon distillate, suitably settling and recycling the resulting settled upper hydrocarbon-rich phase until virtually all the furfural is exhausted from the fractional distillation zone. Cleanup of the settled and separated furfural-rich lower phase or phases collected by distillation (and unrecycled to the primary fractional distillation) to remove soluble hydrocarbons can be done in essentially the same way. Alternatively, a soluble furfural can be separated from any of the hydrocarbon-rich distillate or bottoms fractions by water washing to extract the more water soluble furfural.

Remaining p-cymene-rich residues containing some furfural can be rid of furfural by a topping-fractional distillation to take off furfural and p-cymene. Suitably, also a small amount of one of the lower boiling hydrocarbon cuts or an extraneous liquid can be introduced to distill off with the furfural to the substantial exclusion of p-cymene. Water washing can be used also to remove furfural.

The following example shows one way in which the invention has been practiced, but should not be construed as limiting the invention. In the example all temperatures are in degrees centigrade and all percentages are weight percentages.

*Example*

A reaction mixture for distillation had the following composition, as analyzed by vapor phase chromatography:

| | Percent |
|---|---|
| Tricyclene and menthanes | 0.9 |
| Menthene-3 including cis- and trans-menthene-2 plus a trace of camphene | 27.3 |
| Menthene-1 | 16.8 |
| α-Terpinene | 0.4 |
| p-Cymene | 49.2 |
| High boiling alcohols | 5.4 |

Furfural was added to this reaction mixture to form a batch charge containing 16.6 percent furfural, and the charge put in a distillation flask. The flask was attached to a fractionation column one inch in diameter and 48 inches long, which column was filled with stainless steel protruded packing. The top of the distillation column was equipped with conventional water cooled condensing, refluxing, decanting and collecting equipment arranged schematically as shown in the drawing.

Referring to the drawing flask 12 containing charge 11 was attached to distillation column 13 and boiled at 100 mm. Hg absolute. The vapor at the top of the column 13 was passed through line 9 to condenser 14 from which a portion of the condensate was sent back through reflux return line 15 to the upper zone of the fractionation column at a reflux ratio of 5:1. Reduced pressure was maintained on the system by apparatus, not shown, connecting to line 18. Condensate passed through lines 10 and 16 to decanter 17. In the decanter successive condensed menthene and menthane-enriched distillate fractions (cuts) settled by gravity into hydrocarbon-rich layer 19 and furfural-rich layer 21. Layer 21 was recycled by return line 24 connecting with the upper zone of the fractionation column 13. Layer 19 from the first cut was removed to receiver 22 by means of line 23. The second cut went to an alternate similar receiver not shown.

The first distillation cut boiled at 88–89°. It separated by gravity at about room temperature in decanter 17 into an upper layer containing about 93% hydrocarbon (predominantly menthene-3) and 7% furfural and a lower layer containing about 9% hydrocarbon and 91% furfural. The second distillation cut boiled at 93°. It separated by gravity at about room temperature in decanter 17 into an upper hydrocarbon layer containing about 80% menthene-1, 11% furfural, and 9% p-cymene and a lower layer containing about 81% furfural, 15% menthene-1 and 4% p-cymene.

The hydrocarbon-rich decanted layer from the first cut can be rid of furfural by redistillation as previously described. It will then be predominantly menthene-3 mixed with about 20–30% cis- and trans-menthene-2 and cis- and trans-p-menthane. The hydrocarbon-rich decanted layer from the second cut can be handled similarly to yield predominantly menthene-1 mixed with a small amount of p-cymene.

When the condensate became homogeneous at 96–97°, the recycle from the decanter was discontinued and the condensate collected. Then as the furfural in the charge was exhausted, as determined by rising inflection in the temperature of distilled vapor, 99% pure p-cymene was distilled and collected. The homogeneous condensate distilling before the essentially pure p-cymene was 43 percent p-cymene and 57 percent furfural. The 99% pure p-cymene was 28 percent of the original charge. Using the same distillation charge without furfural, the same rectifying apparatus and pressure, and fractionally distilling until about 87 percent, by weight, of the charge had been removed, the maximum purity of the p-cymene obtained was still only about 81 percent.

I claim:

1. In a fractional distillation process for separating a compound selected from the group consisting of menthenes and menthanes from a distilland containing same and at least one other close-boiling constituent, the improvement which comprises adding furfural to said distilland, and distilling therefrom a mixture having lowered boiling point comprising said compound and furfural.

2. A process for separating p-cymene from a mixture thereof with a compound selected from the group consisting of menthenes and menthanes which comprises forming a distilland of said mixture and furfural, and fractionally distilling from said distilland a composition containing furfural and said compound in a fractional distillation zone.

3. The process of claim 2 wherein the distillation is done at subatmospheric pressure.

4. The process of claim 2 wherein said mixture comprises p-cymene and menthene-1.

5. The process of claim 2 wherein said mixture comprises p-cymene, menthene-1 and menthene-3.

6. The process of claim 5 wherein said mixture additionally contains a compound selected from the group consisting of cis-menthene-2, trans-menthene-2 and their mixtures.

7. The process of claim 2 wherein said mixture comprises p-cymene and a compound selected from the group consisting of cis-p-menthane, trans-p-menthane and their mixtures.

8. The process of claim 2 wherein the resulting distillate is settled into a hydrocarbon-rich fraction and a furfural-rich fraction, and the furfural-rich fraction is returned to the distillation zone.

9. The process of claim 8 wherein said hydrocarbon-rich fraction is further fractionally distilled for yielding a bottoms product enriched in hydrocarbon and an overhead distillate enriched in furfural.

References Cited by the Examiner

Lecat, Chem. Abstracts 22, 4296.

DELBERT E. GANTZ, *Primary Examiner.*

G. E. SCHMITKONS, *Assistant Examiner.*